United States Patent
Bachman et al.

(10) Patent No.: US 10,605,967 B2
(45) Date of Patent: Mar. 31, 2020

(54) RETROREFLECTIVE ELEMENTS INCLUDING PARTICLES

(71) Applicant: 3M INNOVATIVE PROPERTIES COMPANY, St. Paul, MN (US)

(72) Inventors: Ryan A. Bachman, West Saint Paul, MN (US); Jimmie R. Baran, Jr., Prescott, WI (US); Joseph D. Engebretson, Saint Croix Falls, WI (US); James E. Garbe, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/502,685

(22) PCT Filed: Aug. 7, 2015

(86) PCT No.: PCT/US2015/044256
§ 371 (c)(1),
(2) Date: Feb. 8, 2017

(87) PCT Pub. No.: WO2016/022940
PCT Pub. Date: Feb. 11, 2016

(65) Prior Publication Data
US 2017/0242165 A1  Aug. 24, 2017

Related U.S. Application Data

(60) Provisional application No. 62/034,910, filed on Aug. 8, 2014.

(51) Int. Cl.
*G02B 5/128* (2006.01)
*C03C 12/02* (2006.01)
(Continued)

(52) U.S. Cl.
CPC .............. *G02B 5/128* (2013.01); *C03C 12/02* (2013.01); *C03C 17/007* (2013.01); *C09C 3/063* (2013.01);
(Continued)

(58) Field of Classification Search
None
See application file for complete search history.

(56) References Cited

U.S. PATENT DOCUMENTS 3,254,563 A  6/1966  Vries
3,493,403 A  2/1970  Tung
(Continued)

FOREIGN PATENT DOCUMENTS

CN  101614835 A  12/2009
CN  102249547 A  11/2011
(Continued)

OTHER PUBLICATIONS

Collins English Dictionary—Complete & Unabridged 2012 Digital Edition © William Collins Sons & Co. Ltd. 1979, 1986 © HarperCollins Publishers 1998, 2000, 2003, 2005, 2006, 2007, 2009, 2012 available at https://www.dictionary.com/browse/element (Year: 2012).*
(Continued)

*Primary Examiner* — Jennifer D. Carruth
(74) *Attorney, Agent, or Firm* — 3M IPC; Carlos M. Téllez

(57) ABSTRACT

The present disclosure generally relates to retroreflective elements including a core and a plurality of glass or glass-ceramic beads adjacent to the core. The retroreflective elements further include a plurality of particles having a diameter that is less than the diameter of the glass or glass ceramic beads in the retroreflective elements. The present disclosure also generally relates to articles (including, for example, retroreflective roadway liquid pavement markings)
(Continued)

including these retroreflective elements and methods of making and using these retroreflective elements.

12 Claims, 1 Drawing Sheet

(51) Int. Cl.
*E01F 9/524* (2016.01)
*C03C 17/00* (2006.01)
*C09C 3/06* (2006.01)
*C09D 5/33* (2006.01)
*C09D 163/00* (2006.01)

(52) U.S. Cl.
CPC ........... *C09D 5/004* (2013.01); *C09D 163/00* (2013.01); *E01F 9/524* (2016.02); *C03C 2217/42* (2013.01)

(56) References Cited

U.S. PATENT DOCUMENTS

| | | | |
|---|---|---|---|
| 3,709,706 | A | 1/1973 | Sowman |
| 3,935,158 | A | 1/1976 | Watanabe |
| 4,564,556 | A | 1/1986 | Lange |
| 5,750,191 | A | 5/1998 | Hachey |
| 5,774,265 | A | 6/1998 | Mathers |
| 5,897,914 | A | 4/1999 | DePriest |
| 5,942,280 | A | 8/1999 | Mathers |
| 6,245,700 | B1 | 6/2001 | Budd |
| 7,513,941 | B2 | 4/2009 | Frey |
| 7,524,779 | B2 | 4/2009 | Frey |
| 8,394,977 | B2 | 3/2013 | Tiefenbruck |
| 8,591,044 | B2 | 11/2013 | Budd |
| 8,591,045 | B2 | 11/2013 | Budd |
| 2003/0090800 | A1 | 5/2003 | Humpal |
| 2005/0100709 | A1 | 5/2005 | Bescup |
| 2005/0158461 | A1 | 7/2005 | Bescup |
| 2005/0162742 | A1* | 7/2005 | Fleming ................ G02B 5/128 359/536 |
| 2006/0062965 | A1* | 3/2006 | Durant ................... G02B 5/128 428/143 |
| 2008/0280034 | A1 | 11/2008 | Mathis |
| 2009/0196990 | A1 | 8/2009 | Simpson |
| 2009/0291292 | A1 | 11/2009 | Bescup |
| 2011/0164922 | A1* | 7/2011 | Moxlow ................ E01F 9/553 404/16 |
| 2012/0229899 | A1* | 9/2012 | Budd ..................... C03C 12/02 359/536 |
| 2014/0017457 | A1 | 1/2014 | Megaridis |
| 2014/0106165 | A1 | 4/2014 | Johnston |

FOREIGN PATENT DOCUMENTS

| | | |
|---|---|---|
| WO | WO 2009-012116 | 1/2009 |
| WO | WO 2009-140008 | 11/2009 |
| WO | WO 2012-058090 | 5/2012 |
| WO | WO 2014-051852 | 4/2014 |
| WO | WO 2014-056782 | 4/2014 |
| WO | WO 2014-058625 | 4/2014 |
| WO | WO 2014-059415 | 4/2014 |

OTHER PUBLICATIONS

Webster's New World College Dictionary, 4th Edition. Copyright © 2010 by Houghton Mifflin Harcourt available at https://www.collinsdictionary.com/us/dictionary/english/surround (Year: 2010).*
3M All Weather Elements—Product Bulletin, Jan. 2010, 7 pages.
3M Reflective Elements Ultimate Nightime Performance Wet or Dry, 2013, 4 pages.
International Search Report for PCT International Application No. PCT/US2015/044256 dated Nov. 26, 2015. 5 pages.

* cited by examiner

RETROREFLECTIVE ELEMENTS INCLUDING PARTICLES

CROSS REFERENCE TO RELATED APPLICATIONS

This application is a national stage filing under 35 U.S.C. 371 of PCT/US2015/044256, filed Aug. 7, 2015, which claims the benefit of Provisional Application No. 62/034,910, filed Aug. 8, 2014, the disclosures of which are herein incorporated by reference in their entirety.

TECHNICAL FIELD

The present disclosure generally relates to retroreflective elements including particles having a diameter that is less than the diameter of the glass or glass ceramic beads in the retroreflective elements. The present disclosure also generally relates to articles (including, for example, retroreflective roadway liquid pavement markings) including these retroreflective elements and methods of making and using these retroreflective elements.

BACKGROUND

Retroreflective liquid pavement markings typically include retroreflective elements. Such retroreflective elements are described in, for example, U.S. Pat. Nos. 5,750,191; 5,774,265; 5,942,280; 7,513,941; 8,591,044; 8,591,045; and U.S. Patent Publication Nos. 2005/0100709 and 2005/0158461, all of which are incorporated herein in their entirety. Commercially available retroreflective elements include, for example, All Weather Elements made by 3M Company of St. Paul, Minn. An exemplary retroreflective element is shown in FIG. 1. Retroreflective element 100 includes a core 110 adjacent to numerous glass or glass ceramic beads 120 that are adhered to the outermost surface of core 110 by a binder.

As is described in, for example, U.S. Patent Publication No. 2005/0100709, the retroreflective elements are applied onto or into retroreflective, liquid roadway or pavement markings or compositions such that at least a portion of most of the retroreflective elements extends above or out of the roadway or pavement marking. Light that is transmitted by a light source (e.g., a streetlight or a car's headlights) is incident on the retroreflective liquid pavement marking (and the retroreflective elements therein) is retroreflected by the retroreflective elements in the roadway marking. Specifically, the glass or glass ceramic beads transmit incident light back toward the incoming light source.

SUMMARY

The inventors of the present disclosure recognized that many roadway or pavement markings or liquid pavement marking compositions completely cover or wick around the retroreflective elements added onto or into the roadway marking. This is especially true for roadway marking compositions including epoxy. When the liquid pavement marking or liquid pavement marking components wick around or cover all or significant portions of the retroreflective elements, the glass or glass ceramic beads are no longer able to retroreflect incident light, and the optical effectiveness of the liquid pavement marking significantly decreases.

The inventors of the present disclosure discovered that, unexpectedly, retroreflective elements including in the retroreflective elements particles having a diameter that is less than the diameter of the glass or glass ceramic beads reduces the incidence of the liquid pavement marking components wicking up or covering the retroreflective elements. Liquid pavement markings including the retroreflective elements described herein show decreased incidence of wicking by the liquid pavement marking or liquid pavement marking components. The resulting liquid pavement markings exhibit better optical performance because the retroreflective elements are not covered by the liquid pavement marking components and are thus able to retroreflect light incident light.

Some embodiments of the present disclosure relate to a retroreflective element, comprising: a core; a plurality of glass or glass ceramic beads adjacent to the core; and a plurality of particles adjacent to the core, wherein the particles each have a diameter that is smaller than a mean diameter of the glass or glass ceramic beads.

Some embodiments of the present disclosure relate to a liquid pavement marking composition including the retroreflective element described above. In some embodiments, the liquid pavement marking composition includes a retroreflective element embedment composition. In some embodiments, the liquid pavement marking composition includes an epoxy. In some embodiments, the dry particles assist in imparting a low energy retroreflective element surface.

Some embodiments of the present disclosure relate to a method of forming a retroreflective element, comprising: (1) providing an untreated retroreflective element including a core and a plurality of glass or glass ceramic beads adjacent to the core; and (2) contacting the untreated retroreflective element with a plurality of particles each having a diameter that is smaller than a mean diameter of the glass or glass ceramic beads. In some embodiments, the method further involves agitating a mixture of the untreated retroreflective elements and the plurality of particles. In some embodiments, the method further involves contacting the untreated retroreflective elements with a liquid before contacting the untreated retroreflective element with the plurality of particles; wherein the liquid is one of volatile or non-volatile liquid. In some embodiments, the particles are in at least one of a powder or a liquid dispersion. In some embodiments, the liquid dispersion includes an aqueous or non-aqueous carrier and the method further involves drying the retroreflective element. In some embodiments, the method further involves separating the retroreflective elements from the dispersion including the particles. In some embodiments, the dispersion includes at least one of a polymeric resin or a film-forming polymer.

In some of the above embodiments, the particles include at least one of silica, alumina, zirconia, a silicate, a polymer, a diatomaceous earth, or an organic compound or particle. In some embodiments, the silica is at least one of fumed silica, precipitated silica, or nano silica. In some embodiments, the particles include at least one of salts of inorganic acids or salts of organic acids. In some embodiments, the salts of inorganic acids include at least one of sodium chloride, calcium carbonate, and magnesium sulfate. In some embodiments, the salts of organic acids include at least one of sodium acetate, sodium stearate, and sodium ascorbate. In some embodiments, the organic compound or particle includes at least one of polyolefins, silicone polymers, polyesters, and halogenated polymers. In some embodiments, the particles are one of hydrophobic or hydrophilic. In some embodiments, the particles are dry particles. In some embodiments, the glass or glass ceramic beads have a mean diameter of between about 30 and about 200 microns. In some embodiments, the glass or glass ceramic beads have a mean diameter of between about 45 and about 120 microns. In some embodiments, the glass or glass ceramic beads have a mean diameter of between about 60 and about 80 microns. In some embodiments, the particles have a diameter that is between about 1 nanometer and about 60 microns. In some embodiments, the particles have a diameter that is between about 1 nm and about 1000 nm. In some embodiments, the particles have a shape that is at least one of generally plate-like, generally pin-like, or generally spherical. In some embodiments, at least some of the particles includes a plurality of primary particles agglomerated or aggregated to form a particle that has a diameter that is smaller than a diameter of the glass or glass ceramic beads. In some embodiments, the particles are present in a weight percent of between about 0.1 and about 10 wt % based on the total weight of the retroreflective element. In some embodiments, the core is a composite. In some embodiments, the core is at least one of a sand core, sand, glass, polymer, or ceramic. In some embodiments, the glass or glass ceramic beads have a refractive index of between about 1.5 and about 2.6. In some embodiments, the glass or glass ceramic beads have a refractive index of between about 1.8 and about 2.3.

DETAILED DESCRIPTION

Various embodiments and implementations will be described in detail. These embodiments should not be construed as limiting the scope of the present disclosure in any manner, and changes and modifications may be made without departing from the spirit and scope of the inventions. Further, only some end uses have been discussed herein, but end uses not specifically described herein are included within the scope of the present disclosure. As such, the scope of the present disclosure should be determined only by the claims.

The term "retroreflective" as used herein refers to the attribute of reflecting an obliquely incident radiation ray in a direction generally antiparallel to its incident direction such that it returns to the radiation source or the immediate vicinity thereof.

The present disclosure generally relates to a retroreflective element including (1) a core; (2) a plurality of glass or glass ceramic beads adjacent to the core; and (3) a plurality of particles adjacent to the core. The particles each have a diameter that is smaller than the mean diameter of the glass or glass ceramic beads. In some embodiments, the particles are dry particles, where "dry" refers to substantially lacking liquid or resin. Substantially lacking liquid or resin means that the particles include less than 5 wt % liquid or resin. In some embodiments, the particles include less than 4 wt %, 3 wt %, 2 wt %, 1 wt %, or 0.5 wt % liquid or resin.

The retroreflective elements described herein have improved embedment properties in liquid pavement marking compositions, particularly epoxy pavement markings. Specifically, liquid pavement markings including retroreflective elements of the type described herein exhibits desirable, lower embedment in liquid roadway or pavement markings, especially those including epoxy. Without being limited by theory, it is believed that the particles assist in moderating the embedment of the retroreflective elements in the liquid pavement marking or liquid pavement marking components of the roadway marking. Because the beneficial effects of these retroreflective elements can be achieved with relatively low weight ratios of particles, this is a cost-effective method of increasing liquid pavement marking optical performance and durability.

Additionally, because the optical performance of the roadway marking is increased, the roadway making can remain on the roadway longer, reducing the incidence of roadway closure for liquid pavement marking application as well as expense of roadway upkeep.

Also, because the particles of the present disclosure are lower cost and provide the beneficial optical and durability effects at low concentration, manufacturing cost of an excellent liquid pavement marking and of the retroreflective elements capable of inclusion therein is lowered.

Figure 1:
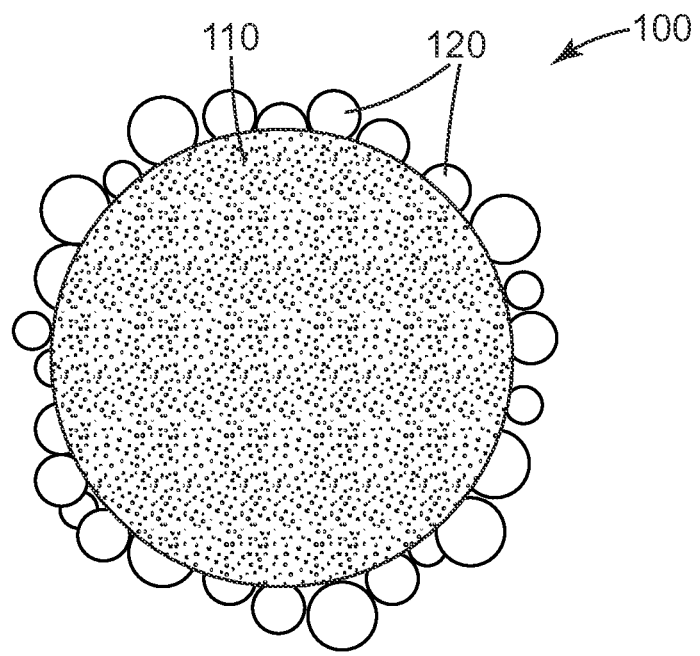
FIG. 1 is a schematic drawing of a prior art retroreflective element.
Figure 2:
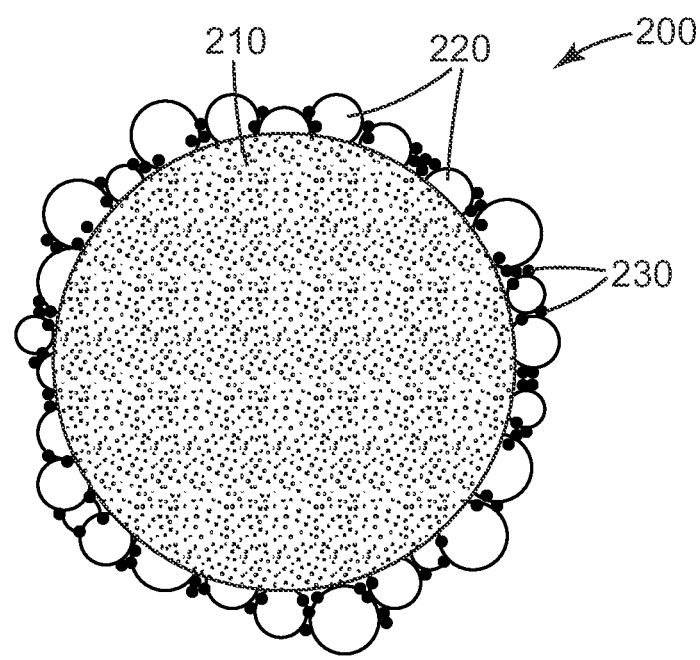
FIG. 2 is a schematic drawing of an exemplary retroreflective element of the type generally described in the present disclosure.

FIG. 2 shows a schematic view of an exemplary retroreflective element of the general type described herein. Retroreflective element 200 includes a core 210 to which are attached or adjacent a plurality of glass or glass ceramic beads 220. Also attached or adjacent to the core are a plurality of small particles 230. In some embodiments, at least some of particles 230 are in contact with core 210 and/or glass or glass ceramic beads 220.

In the specific exemplary embodiment shown in FIG. 2, particles 230 are represented as located in the spaces between and adjacent glass or glass ceramic beads 220 and closer to the surface of core 210 rather than to the distal surface of glass or glass ceramic beads 220. However, FIG. 2 is merely one exemplary embodiment. In some embodiments, the particles are in the gaps or channels between the glass or glass ceramic beads. In some embodiments, the glass or glass ceramic beads are closer to the distal surface of glass or glass ceramic beads 220. In some embodiments, the particles are present in a proportion that is too small to cover substantial portions of the exposed beads. As used herein, the term "a plurality of particles adjacent to the core," adjacent is meant to mean "near." In this phase, "adjacent" is not meant to mean directly adjacent. As such, the term "a plurality of particles adjacent to the core" is mean to include all of the constructions described or suggested in this paragraph.

The core can include, for example, glass, ceramic, polymer, or an oxide such as silicon dioxide. Some exemplary cores are described in, for example, U.S. Pat. Nos. 5,774,265; 5,942,280; and 7,513,941, all of which are incorporated herein by reference. One exemplary type of core is a sand core, which is described generally in U.S. Patent Publication No. 2005/0100709. In some embodiments, the core is at least one of a sand core, sand, glass, polymer, or ceramic.

Any existing retroreflective element glass or glass ceramic beads can be used in the retroreflective elements of the present application. This includes, for example, those glass or glass ceramic beads described in U.S. Pat. Nos. 3,493,403; 3,709,706; 4,564,556; and 6,245,700, all of which are incorporated herein in their entirety.

In some embodiments, the glass or glass ceramic beads have mean or average diameters of 30-200 microns. In some embodiments, the glass or glass ceramic beads have mean or average diameters of 50-100 microns. In some embodiments, the glass or glass ceramic beads have mean or average diameters of 60-80 microns.

In some embodiments, the glass or glass ceramic beads have refractive indices of between about 1.5 and about 2.6. In some embodiments, the glass or glass ceramic beads have refractive indices of between about 1.8 and about 2.3. In some embodiments, the glass or glass ceramic beads have a mean refractive index of between about 1.8 and about 2.3. In some embodiments, the glass or glass ceramic beads have a refractive index of between about 1.9 and about 2.2. In some embodiments, the glass or glass ceramic beads have a refractive index of about 1.9. In some embodiments, the glass or glass ceramic beads have a refractive index of about 2.2.

Some exemplary glass compositions include those described, for example, in U.S. Pat. Nos. 6,245,700 and 7,524,779, both of which are incorporated herein in their entirety. In some embodiments, the glass or glass ceramic beads include at least one or more of, for example, a lanthanide series oxide, aluminum oxide, $TiO_2$, BaO, $SiO_2$, or $ZrO_2$.

In some embodiments, the core and glass or glass ceramic beads are in a bonded core element construction. Examples of commercially available constructions of this type include, for example, All Weather Elements made by 3M Company of St. Paul, Minn. and Reflective Elements made by 3M Company.

In some embodiments, the particles have a diameter that is less than the diameter of the glass or glass ceramic beads. In some embodiments, the particles have a diameter that is between about 1 nm and about 30 microns. In some embodiments, the particles have a diameter that is between about 1 nm and about 50 microns. In some embodiments, the particles have a diameter that is between about 1 nm and about 60 microns. In some embodiments, the particles have a diameter that is between about 1 nm and about 1000 nm.

In some embodiments, the particles include at least one of silica, alumina, zirconia, a silicate, a polymer, a diatomaceous earth, or an organic compound or particle. In some embodiments that include silica, the silica can be, for example, fumed silica, precipitated silica, surface modified silica, or nanosilica. Some examples of such silica-containing particles include, for example, fumed silica available under the trade designation AEROSIL from Evonik Degussa, (Parsippany, N.J.); precipitated silica available under the trade designation FLO-GARD from PPG Industries (Pittsburgh, Pa.), and nanosilica as described in, for example, U.S. Pat. No. 8,394,977, incorporated herein by reference.

In some embodiments, the particles include at least one of salts of inorganic acids or salts of organic acids. In some embodiments that include salts of inorganic acids, the particles can include, for example, at least one of sodium chloride, calcium carbonate, and/or magnesium sulfate. In some embodiments that include salts of organic acids, the particles can include, for example, at least one of sodium acetate, sodium stearate, sodium ascorbate, biogenic compounds (e.g., sugars and amino acids), and/or petroleum-derived compounds (e.g., hydrocarbon wax particles).

In some embodiments including an organic compound, particle, or component, the organic compound, particle, or component can include, for example, at least one of a polyolefin (e.g., polyethylene and/or polypropylene), a silicone polymer (e.g., poly(dimethylsiloxane)), a polyester, and/or a halogenated polymer (e.g., poly(vinylidene fluoride) and/or polytetrafluoroethylene)). In some embodiments, the organic compound, particle, or component includes a polymer powder.

In some embodiments, the particles are one of hydrophobic or hydrophilic. In some embodiments, the particles include both hydrophobic particles and hydrophilic particles. In some embodiments that include hydrophobic particles, the particles have been treated with or reacted with an organic compound that transfers organic groups (e.g., hydrocarbon groups) to reactive sites on the surfaces of the particles. The extent of hydrophobicity can be controlled by choice and concentration of the organic compound, and by the concomitant use of other organic compounds to tailor the surface properties of the particles.

In some embodiments, the particles have a shape that is at least one of needles, plates, pins, or spheres.

In some embodiments, at least some of the particles include a plurality of primary particles agglomerated or aggregated to form a particle that has a diameter that is smaller than a diameter of the glass or glass ceramic beads. Some examples of such agglomerated or aggregated particles include, for example, fumed silica and precipitated silica.

In some embodiments, the particles are present in a weight percent of between about 0.1 and about 10 wt % based on the total weight of the particles.

In some embodiments, the particles are dry particles (meaning that they substantially lack liquid or resin).

In some embodiments, the resulting retroreflective elements have a mean or average diameter of between about 100 microns and about 2000 microns.

In some embodiments, the retroreflective elements are essentially spherical, as described in, for example, U.S. Pat. Nos. 5,942,280 and 7,513,941, both of which are incorporated herein in their entirety. In some embodiments, the retroreflective elements are non-spherical, as described in, for example, U.S. Pat. No. 5,774,265, incorporated by reference herein in its entirety.

The retroreflective elements can have any desired topography. For example, the elements can be roughly spherical overall, with an outer surface of closely packed glass or glass ceramic beads. In some embodiments, the glass or glass ceramic beads are spherical. Regardless of the shape of the element, one preferred surface topography is close packed, which assists in maximizing retroreflectivity (brightness).

The retroreflective elements described herein can be made, manufactured, or formed by any of several methods. In one exemplary embodiment, a plurality of structures including the core and glass or glass ceramic beads are combined with a plurality of the particles. The mixture can then be agitated by shaking or stirring, or in, for example, a fluidized bed. In this embodiment, the particles can be, for example, in powder form.

In another embodiment, the structures including the core and glass or glass ceramic beads are treated with a volatile or non-volatile liquid, and are then treated with the particles. The particles can be, for example, in a powder form. In some embodiments, the volatile or non-volatile is reactive with the liquid pavement marking composition to which the retroreflective elements will ultimately be applied.

In another embodiment, the structures including the core and glass or glass ceramic beads are treated with a liquid dispersion including the particles in an aqueous or a non-aqueous carrier and subsequently dried. In some embodiments, the liquid dispersion includes a polymeric resin or a film-forming polymer as a binder for the particles (e.g., the binder holds the particles adjacent to the core).

The present disclosure also relates to both liquid pavement marking including the retroreflective elements described herein and to methods of making and using the roadway marking liquid pavement marking. Any known liquid pavement marking can be used with the retroreflective elements described herein. Some exemplary commercially available roadway marking liquid pavement markings capable of use with the retroreflective elements include, for example, Liquid Pavement Marking Series 5000, available from 3M Company, St. Paul, Minn.; HPS-2, available from Ennis-Flint, Thomasville, N.C.; and LS90, available from Epoplex, Maple Shade, N.J. In some embodiments, the roadway making liquid pavement marking includes a colorant. In some embodiments, the liquid pavement marking is white or yellow.

Any known process for including or applying retroreflective elements to a liquid pavement marking composition may be used to include or apply the retroreflective elements described herein to a roadway marking or liquid pavement marking. For example, the methods described in the following patents may be used: U.S. Pat. Nos. 3,935,158 and 5,774,265, both of which are incorporated in their entirety herein.

Objects and advantages of the present disclosure are further illustrated by the following examples, but the particular materials and amounts thereof recited in the examples, as well as other conditions and details, should not be construed to unduly limit the scope of the application, as those of skill in the art will recognize that other parameters, materials, and equipment may be used. All parts, percentages and ratios herein are by weight unless otherwise specified.

EXAMPLES

Structures including a core and glass or glass ceramic beads ("core/bead structures") that were used to prepare the retroreflective elements of the present disclosure were prepared essentially as described in Example 1 of U.S. Patent Publication No. 2005/0158461, incorporated in its entirety herein.

As used herein:
"T-403" refers to JEFFAMINE T-403, a polyetheramine available from Huntsman Corp., The Woodlands, Tex.

"AEROSIL R 972" refers to a hydrophobic fumed silica obtained from Evonik Degussa Corp., Parsippany, N.J.

"AEROSIL R 711" refers to a hydrophobic fumed silica obtained from Evonik Degussa Corp., Parsippany, N.J.

"AEROSIL 200" refers to a hydrophilic fumed silica obtained from Evonik Degussa Corp., Parsippany, N.J.

"Nanosilica" refers to a hydrophobic isooctylsilane-modified nanosilica having an average particle size of about 5 nanometers prepared essentially as described in U.S. Pat. No. 5,586,483, incorporated in its entirety herein.

"FLO-GARD SP" refers to a precipitated silica obtained from PPG Industries, Inc., Pittsburgh, Pa.

"SERIES 71E ALL WEATHER ELEMENTS" or "SERIES 71E AWE" independently refer to retroreflective elements, available from 3M Company, St. Paul, Minn., intended for application on liquid epoxy pavement marking compositions.

Examples 1-15

Preparation of Retroreflective Elements Including Particles.

In each of Examples 1-7, a weighed portion of core/bead structures was combined with a weighed portion of particles in a 1-gallon plastic bag. The weights of each of the components of Examples 1-7 are given in Table 1. The top of the bag was sealed and the mixture was shaken by hand for approximately 1 minute to yield the retroreflective elements. The elements were then transferred to and were briefly shaken in a No. 30 standard sieve to separate the retroreflective elements from any excess particles.

TABLE 1

Weights of Components of Examples 1-7.

| Example | Wt. Core/ Bead Structure | Particles (Wt.) |
| --- | --- | --- |
| 1 | 25 grams | AEROSIL R 711 (0.1 gram) |
| 2 | 25 grams | AEROSIL R 972 (0.1 gram) |
| 3 | 25 grams | Nanosilica (0.1 gram) |
| 4 | 25 grams | FLO-GARD SP (0.1 gram) |
| 5 | 15 grams | AEROSIL R 711 (0.3 gram) |
| 6 | 7.5 grams | AEROSIL R 711 (0.3 gram) |
| 7 | 25 grams | AEROSIL 200 |

In Example 8, 25 grams of core/bead structures were added to a 1-gallon plastic bag in which 0.26 grams of AEROSIL R 711 had previously been shaken by hand. The AEROSIL R 711 appeared to be deposited on the inside surface of the bag. The top of bag was then sealed and the bag was shaken by hand for approximately 1 minute to afford the retroreflective elements. The elements were then transferred to and were briefly shaken in a No. 30 standard sieve as described above.

Example 9 was carried out essentially as described in Example 8, except that 0.1 gram of AEROSIL R 711 was used in Example 9.

In Example 10, 10 grams of core/bead structures were combined with 0.11 grams of AEROSIL R 711 in a 1-gallon plastic bag and the bad was shaken by hand for approximately 1 minute. Then an additional 15 grams of core/bead structures were added to the bag, and the bag was again was shaken by hand for approximately 1 minute to afford retroreflective elements. The elements were then transferred to and were briefly shaken in a No. 30 standard sieve as described above.

In Example 11, 10 grams of core/bead structures were combined with 0.11 grams of nanosilica in a 1-gallon plastic bag and the bad was shaken by hand for approximately 1 minute. Then an additional 15 grams of core/bead structures were added to the bag and the bag was again was shaken by hand for approximately 1 minute to afford retroreflective elements. The elements were then transferred to and were briefly shaken in a No. 30 standard sieve as described above.

In Examples 12-14, 200 grams of core/bead structures were first combined with a solution 0.21 gram T-403 and 20.7 grams of water, and the resultant wet mixture was then dried in an oven at 70° C. for 1 hour after which time the product was allowed to cool to room temperature. In each of Examples 12-14, 25 gram portions of this product were used. In Example 12, a 25 gram portion was combined with 0.1 gram of AEROSIL R 711 in a 1-gallon plastic bag and was processed as described above to afford retroreflective elements. In Example 13, a 25 gram portion was combined with 0.1 gram of nanosilica in a 1-gallon plastic bag and was processed as described above to afford retroreflective elements. In Example 14, a 25 gram portion was combined with 0.1 gram of AEROSIL 200 in a 1-gallon plastic bag and was processed as described above to afford retroreflective elements.

In Example 15, 25 grams of core/bead structures were first treated with 10 grams of a solution of 1 gram of mineral oil, U.S.P. in 9 grams of hexane by stirring the structures and the solution together in a beaker at room temperature until most of the hexane had evaporated. This material was then dried in an oven at 60° C. for 20 minutes, after which time it was combined with 0.1 gram AEROSIL R 711 in a 1-gallon plastic bag and was processed as described above to afford retroreflective elements.

In Example 16, 25 grams of core/bead structures were first treated with 20 grams of a solution of 1 gram of ceteareth-20 (a nonionic surfactant obtained under the trade designation "TEGO ALKANOL CS 20P" from Evonik Industries, Essen, Germany) in 19 grams of water by stirring the structures and the solution together in a beaker for about 10 minutes. This material was then dried in an oven at 60° C. for 2 hours, after which time it was combined with 0.25 gram AEROSIL 200 in a 1-gallon plastic bag and was processed as described above to afford retroreflective elements.

Examples 17-32 and Comparative Examples A, B, C and D

Evaluation of Embedment of Retroreflective Elements in Epoxy Pavement Marking Composition.

In each of Examples 17-32, the retroreflective elements of Examples 1-16 were each deposited on a coating of a liquid epoxy pavement marking composition to evaluate its degree of embedment in the epoxy. In each of Comparative Examples A and B, core/bead structures and SERIES 71E ALL WEATHER ELEMENTS ("Series 71 E AWE"), respectively, were similarly deposited and evaluated. In Comparative Example C, the core/bead structures treated with only ceteareth-20, as described above in Example 16, were similarly deposited and evaluated. In Comparative Example D, the core/bead structure treated only with mineral oil, U.S.P., as described in Example 15, were similarly deposited and evaluated. The liquid epoxy pavement marking composition (available under the trade designation HPS-2 from Ennis-Flint, Thomasville, N.C.), was coated at room temperature onto aluminum panels using a notched coating bar set for a wet coating thickness of 0.762 millimeter (0.030 inch), and then the retroreflective elements and the comparative materials were each deposited on the coatings from glass jars having perforated caps. The coatings were allowed to cure at room temperature for at least 5 hours before the degree of embedment was qualitatively evaluated by observing the approximate average proportion of the elements that were protruding above the surface of the epoxy coating. The data are given in Table 2. In Table 2, a high degree of embedment (more than about half of the surface of the element or the comparative material covered with epoxy) is indicated by a minus "−" sign, a lower degree of embedment (about half of the surface covered with epoxy) is indicated by the numeral "0" and a low degree of embedment (less than about half of the surface of the element or the comparative material is covered with epoxy) is indicated by a plus "+" sign.

TABLE 2

Embedment of Retroreflective Elements in Epoxy Pavement Coatings.

| Example | Retroreflective Elements | Embedment in Epoxy Coating |
| --- | --- | --- |
| CE A | Core/bead structures | − |
| CE B | Series 71 E AWE | + |
| CE C | Ceteareth-20 | − |
| CD D | Mineral oil U.S.P. | − |
| 17 | Example 1 | + |
| 18 | Example 2 | + |

TABLE 2-continued

Embedment of Retroreflective Elements in Epoxy Pavement Coatings.

| Example | Retroreflective Elements | Embedment in Epoxy Coating |
| --- | --- | --- |
| 19 | Example 3 | + |
| 20 | Example 4 | + |
| 21 | Example 5 | + |
| 22 | Example 6 | + |
| 23 | Example 7 | + |
| 24 | Example 8 | + |
| 25 | Example 9 | + |
| 26 | Example 10 | + |
| 27 | Example 11 | + |
| 28 | Example 12 | + |
| 29 | Example 13 | 0 |
| 30 | Example 14 | + |
| 31 | Example 15 | + |
| 32 | Example 16 | 0 |

The data in Table 2 show, for example, that retroreflective elements including particles become embedded to a lower degree in epoxy coatings than the core/bead structures.

All references mentioned herein are incorporated by reference.

Unless otherwise indicated, all numbers expressing feature sizes, amounts, and physical properties used in the present disclosure and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this disclosure and the appended claims, the term "or" is generally employed in its sense including "and/or" unless the content clearly dictates otherwise.

Various embodiments and implementation of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments and implementations other than those disclosed. Those having skill in the art will appreciate that many changes may be made to the details of the above-described embodiments and implementations without departing from the underlying principles thereof. It should be understood that this invention is not intended to be unduly limited by the illustrative embodiments and examples set forth herein and that such examples and embodiments are presented by way of example only with the scope of the invention intended to be limited only by the claims set forth herein as follows. Further, various modifications and alterations of the present invention will become apparent to those skilled in the art without departing from the spirit and scope of the present disclosure. The scope of the present application should, therefore, be determined only by the following claims.

What is claimed is:

1. A retroreflective element, comprising:
   a core;

a plurality of glass or glass-ceramic beads adjacent to and entirely surrounding the core; and
a plurality of particles adjacent to and surrounding the core, wherein the particles each have a diameter that is smaller than a mean diameter of the glass or glass ceramic beads,
wherein the element has a size from 100 microns to 2000 microns,
wherein the particles have a diameter from about 1 nm to 1000 nm, and
wherein the glass or glass ceramic beads have a mean diameter of between about 60 and about 80 microns.

2. The retroreflective element of claim 1, wherein the particles include at least one of silica, alumina, zirconia, a silicate, a polymer, a diatomaceous earth, or an organic compound or particle.

3. The retroreflective element of claim 2, wherein the organic compound or particle includes at least one of polyolefins, silicone polymers, polyesters, and halogenated polymers.

4. The retroreflective element of claim 2, wherein the silica is at least one of fumed silica, precipitated silica, or nano silica.

5. The retroreflective element of claim 1, wherein the particles include at least one of salts of inorganic acids or salts of organic acids.

6. The retroreflective element of claim 5, wherein the salts of inorganic acids include at least one of sodium chloride, calcium carbonate, and magnesium sulfate.

7. The retroreflective element of claim 5, wherein the salts of organic acids include at least one of sodium acetate, sodium stearate, and sodium ascorbate.

8. The retroreflective element of claim 1, wherein at least some of the particles includes a plurality of primary particles agglomerated or aggregated to form a particle that has a diameter that is smaller than a diameter of the glass or glass ceramic beads.

9. The retroreflective element of claim 1, wherein the particles are present in a weight percent of between about 0.1 and about 10 wt % based on the total weight of the retroreflective element.

10. The retroreflective element of claim 1, wherein the glass or glass ceramic beads have a refractive index of between about 1.8 and about 2.3.

11. The retroreflective element of claim 1, wherein the core is spherical.

12. A pavement marking, comprising:
a liquid pavement marking composition;
the retroreflective element of claim 1 secured to the liquid pavement marking composition.

* * * * *